(12) United States Patent
Narbonne et al.

(10) Patent No.: US 10,396,340 B2
(45) Date of Patent: Aug. 27, 2019

(54) DEVICE AND METHOD FOR MAKING A BATTERY SAFE

(71) Applicant: SAFT, Bagnolet (FR)

(72) Inventors: Alexandre Narbonne, Blanquefort (FR); Christophe Dos Reis, Blanquefort (FR)

(73) Assignee: SAFT, Bagnolet (FR)

( * ) Notice: Subject to any disclaimer, the term of this patent is extended or adjusted under 35 U.S.C. 154(b) by 0 days.

(21) Appl. No.: 15/202,831

(22) Filed: Jul. 6, 2016

(65) Prior Publication Data
US 2017/0012274 A1  Jan. 12, 2017

(30) Foreign Application Priority Data

Jul. 7, 2015 (FR) ..................... 15 56417

(51) Int. Cl.
| | | |
|---|---|---|
| H01M 2/34 | (2006.01) | |
| H01M 2/20 | (2006.01) | |
| H01R 11/28 | (2006.01) | |
| H01R 13/64 | (2006.01) | |
| H02J 7/00 | (2006.01) | |

(52) U.S. Cl.
CPC ............ *H01M 2/34* (2013.01); *H01M 2/202* (2013.01); *H01M 2/206* (2013.01); *H01R 11/288* (2013.01); *H01R 13/64* (2013.01); *H02J 7/0045* (2013.01); *H01M 2200/00* (2013.01); *H01M 2220/10* (2013.01)

(58) Field of Classification Search
None
See application file for complete search history.

(56) References Cited

U.S. PATENT DOCUMENTS

2006/0270286 A1* 11/2006 Zhao ................. H01M 2/206
                                                         439/840
2013/0177790 A1   7/2013 Yang et al.

FOREIGN PATENT DOCUMENTS

EP       0 078 386 A1    5/1983
WO    2013/182589 A2   12/2013

OTHER PUBLICATIONS

French Preliminary Search Report for FR 15 56417 dated May 10, 2016.
Written Opinion for FR 15 56417 dated May 10, 2016.

* cited by examiner

*Primary Examiner* — Wojciech Haske
(74) *Attorney, Agent, or Firm* — Sughrue Mion, PLLC

(57) ABSTRACT

A safety device (19) for a battery (12) being designed so that an electrical connector (18) can be connected to the positive (14) and negative (16) electrical terminals of the battery (12) in a first (A+, A−) or a second (B+, B−) connection position, the safety device (19) being adapted to be selectively positioned in a first or a second safety position so that only the desired connection positions are accessible to an electrical connector (18). A battery including the safety device or a set of such batteries and a method for making such a set of batteries safe.

13 Claims, 4 Drawing Sheets

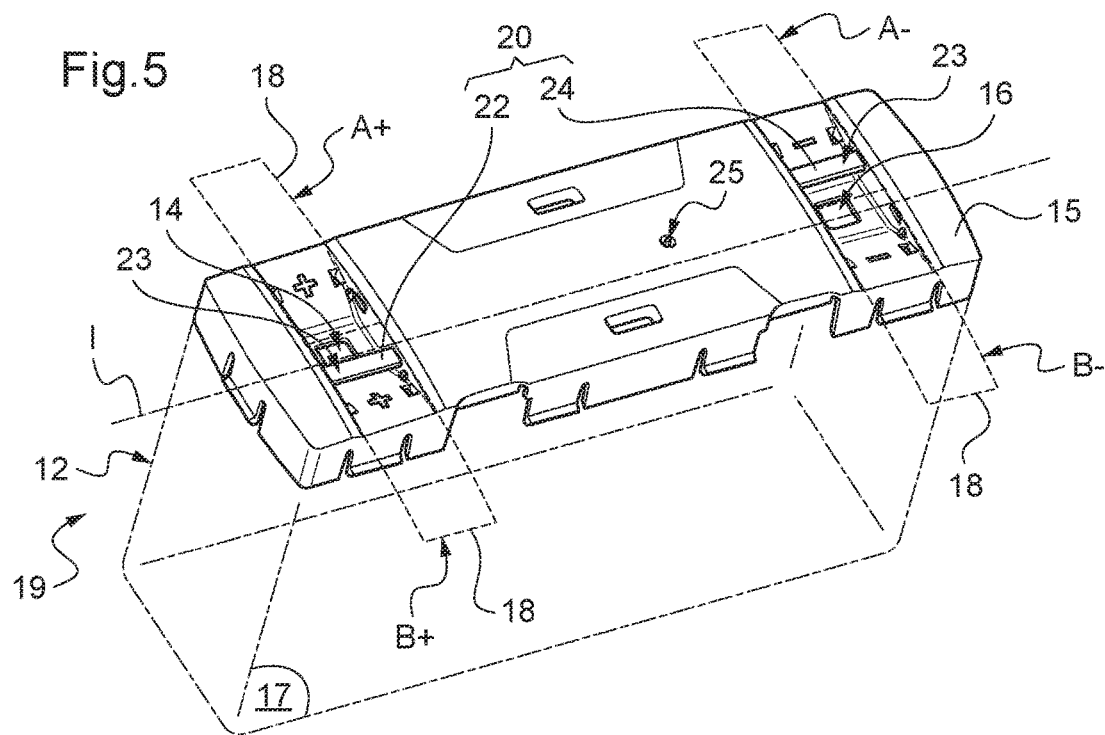
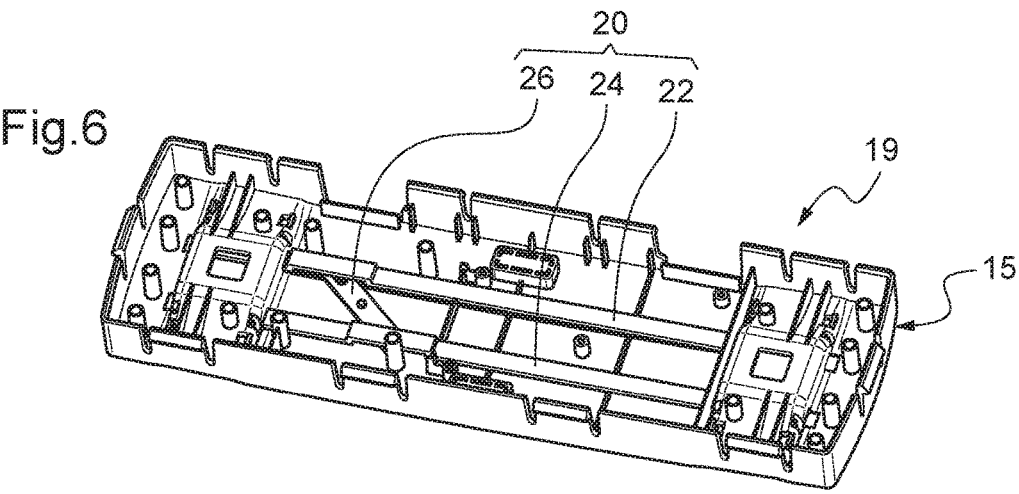
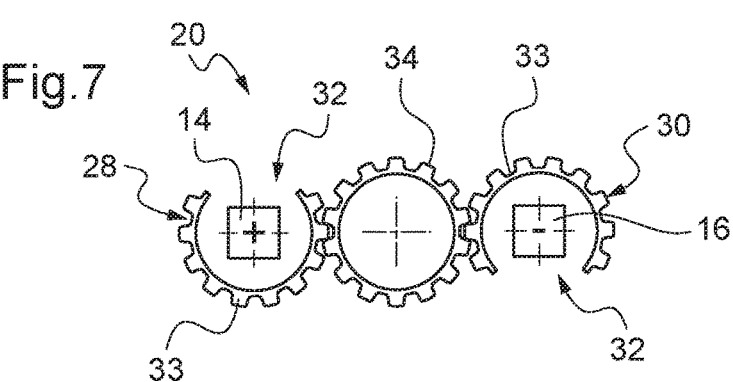

DEVICE AND METHOD FOR MAKING A BATTERY SAFE

BACKGROUND OF THE INVENTION

Field of the Invention

The present invention relates to a safety device for a battery or a set of batteries. The invention also relates to a battery suitable for being made safe by means of such a safety device, as well as a set of such batteries. The invention further relates to a method for making such a set of batteries safe.

Prior Art

Batteries are known which are designed based on electrochemical elements of the lithium-ion or nickel-metal hydride type designed to serve as emergency power supplies for low-voltage telecommunication networks. These batteries can be disposed in a modular casing, also called a bay or "rack." Each bay can contain several batteries each delivering 48 V. A direct current to alternating current power converter (DC/AC) makes it possible to convert the direct current generated by the batteries into alternating current usable for supplying electronic systems of telecommunications networks. It is possible to refer to the site www.saft-batteries.com which gives more information on this type of emergency power supply, in particular the battery systems of the Intensium line.

Such a battery bay is shown in FIGS. 1a and 1b. A bay 40 includes a plurality of identical batteries 42 installed one above the other so that one face 44 of each battery 42 is substantially positioned in the same plane. Referring to FIG. 2, each face 44 includes access to a positive electrical terminal 46 and a negative electrical terminal 48 of a battery 42. The batteries 42 are interconnected by means of electrical connectors 50 so that the electrical connectors 50 connect a positive electrical terminal 46 of one battery 42 to a negative electrical terminal 48 of another battery 42. In particular, the positive electrical terminal 46 of one battery 42 can be connected to an electrical connector 50 at a first connection position A+ or a second connection position B+. Similarly, the negative electrical terminal 48 of a battery 42 can be connected to an electrical connector 50 at a first connection position A− or a second connection position B−. The first connection positions A+ and A− are located on the same side of the battery 42 and the second connection positions B+ and B− are located on the same other side of the battery 42.

The batteries 42 are symmetric so that they can be used reversibly. In other words, the batteries 42 can be positioned in the bay 40 so that the positive 46 and negative 48 electrical terminals are respectively located either on the right and on the left or on the left and on the right of the battery 42.

To reduce the distance between two electrical terminals intended to be connected together by an electrical connector 50 and thus facilitate the interconnection of the batteries 42, the batteries 42 are installed head-to-tail, as can be seen in FIG. 3. In other words, the batteries 42 are positioned in the bay 40 so that a positive electrical terminal 46 of a first battery 42 is positioned facing, or aligned in a direction extending from top to bottom of the bay 40 with respect to, a negative electrical terminal 48 of a second battery 42 positioned above or below the first battery 42. In particular, FIG. 3 shows a schematic of the connection of three batteries 42 interconnected by two electrical connectors 50 to allow the operation of the bay 40.

A major disadvantage, however, of the batteries 42 is that an electrical connector 50 can be positioned in an undesired position during assembly of the batteries and cause a short-circuit in the electrical circuit connecting the batteries 42, risking damage to the batteries 42. Such an undesired connection position of an electrical connector 50 is shown in FIG. 4, where an electrical connector 50 is connected between the second connection positions B− and B+ of two batteries 42 while another electrical connector 50 is simultaneously connected in the second connection positions B+ and B− of the same two batteries 42. Supply of electrical current to the circuit connecting the batteries 42 would bring about a short-circuit symbolized by 52.

An existing solution to limit the risks of confusion consists of supplying an operator in charge of interconnecting the batteries 42 an assembly schematic of the batteries 42 or an assembly template. However, the risk of confusion in positioning an electrical connector 50, as well as the assembly time of the electrical connectors 50, are too high.

It is also known to the person skilled in the art that errors in connecting electric devices can be avoided by means of connection devices that prevent mismating. What is meant by the term "connection device that prevents mismating" is a connection device including means making it possible to prevent the connection of the connection device in an undesired connection position. To allow them to prevent mismating, such devices comprise mechanical members such as formed or positioned fingers, pins, notches or a combination thereof. However, these connection devices are specialized and costly. Moreover, such a solution for avoiding mismating of the connection positions does not make it possible to avoid connection errors if another type of connection device is used, particularly a connection device that does not prevent mismating.

Document WO-A2-2013/182589 describes a device comprising a plurality of batteries interconnected by a connection bar (called a "bus bar") comprising connection elements the structure whereof is specifically configured to avoid incorrect assembly of the batteries. In particular, each connection element is constructed to cooperate, at one end, with a pole of a battery or an end-of-circuit element and, at the other end, with another connection element so that the connection elements overlap once the bus bar is installed on the batteries. However, such a device necessitates the use of complex and costly connection elements specifically designed for the type of batteries used in the device. Moreover, the assembly of the connection elements to interconnect the batteries is made difficult, increasing the time required for assembling the device.

SUMMARY OF THE INVENTION

The purpose of the present invention is to supply a device making it possible to resolve at least partially the aforementioned disadvantages.

More particularly, the invention aims to allow simple and rapid interconnection of a plurality of batteries, particularly of a set of batteries installed in the form of a bay, while still reducing the risks linked to an unsuitable interconnection of the batteries.

To this end, the present invention proposes a safety device for a battery comprising a positive electrical terminal and a negative electrical terminal adapted to be connected to an electrical connector, the battery being adapted so that an electrical connector is able to be connected to each of the positive and negative electrical terminals at a first or a second connection position, the safety device comprising a safety member adapted to be selectively positioned in a first safety position wherein the safety member prevents the connection of an electrical connector in the second connection position of the positive electrical terminal and in the first connection position of the negative electrical terminal, or a second safety position wherein the safety member prevents the connection of an electrical connector in the first connection position of the positive electrical terminal and in the second connection position of the negative electrical terminal.

Such a safety device makes it possible to limit access to the positive and negative electrical terminals so that only the desired connection positions are accessible. The safety device therefore constitutes a mechanical obstacle preventing an operator from being mistaken about the desired connection position. This is particularly advantageous in a bay wherein a plurality of batteries are installed one above the others and interconnected in series in the same electrical circuit. In such a bay, the safety device makes it possible to avoid any risk of confusion by an operator charged with interconnecting the batteries by means of electrical connectors given that access to connection positions which can bring about a short-circuit is obstructed.

The safety device also makes it possible to reduce the assembly time of the electrical connectors on the batteries with respect to existing solutions, where only assembly schematics or assembly templates make it possible to correctly interconnect the batteries. In fact, only the connection positions wherein the electrical connectors are to be connected are accessible.

The advantages cited above are beneficial to the connection of the batteries by an operator during several stages of life of the battery, particularly fabrication, repair by a professional or by a client who is a recipient of the batteries.

Moreover, the integration of the safety device at the battery module makes it possible not to force a user to use a specific type of electrical connector. In fact, any electrical connector adapted to be connected to the positive and negative terminals can be used.

According to one embodiment, the safety member is adapted to be moved in translation to be positioned in the first or the second safety position.

According to another embodiment, the safety member comprises:
 a first arm movable between the positive and negative electrical terminals adapted to prevent the connection of an electrical connector in:
  the first connection position of the positive electrical terminal and to simultaneously allow access to the first connection position of the negative electrical connection; or
  the first connection position of the negative terminal and to allow access simultaneously to the first connection position of the positive electrical terminal; and
 a second arm movable between the positive and negative electrical terminals adapted to prevent the connection of an electrical connector in:
  the second connection position of the positive electrical terminal and to allow simultaneously access to the second connection position of the negative electrical terminal; or
  the second connection position of the negative electrical terminal and to simultaneously allow access to the second connection position of the positive electrical terminal.

According to another embodiment, the safety member also comprises a connection arm integrated with each of the first and second arms so that when one of the first and second movable arms translates in one direction, the other translates in the opposite direction.

According to another embodiment, the safety member is adapted to be moved in rotation to be positioned in the first or the second safety position.

According to another embodiment, the safety member comprises
 a first element movable between the first and second connection positions of the positive electrical terminal adapted to prevent the connection of an electrical connector in:
  the first connection position of the positive electrical terminal and to simultaneously allow access to the second connection position of the positive electrical connection; or
  the second connection position of the positive electrical terminal and to allow access simultaneously to the first connection position of the positive electrical terminal; and
 a second element movable between the first and second connection positions of the negative electrical terminal adapted to prevent the connection of an electrical connector in:
  the first connection position of the negative electrical terminal and to allow simultaneously access to the second connection position of the negative electrical terminal; or
  the second connection position of the negative electrical terminal and to simultaneously allow access to the first connection position of the negative electrical terminal.

According to another embodiment, the first and second movable elements are formed by a gear wheel movable about its axis, including a recess adapted to be positioned at one of the connection positions to allow access to it by an electrical connector.

According to another embodiment, the safety member also comprises a connection element between the first and second movable elements, the connection element being formed by a gear wheel movable about its axis, adapted to cooperate by meshing with the first and second movable elements so that a rotation in one direction of rotation of one of the first and second movable elements causes a rotation of the other movable element in the opposite direction.

According to another embodiment, the safety device is adapted to be integrated into a connection wall of a battery capable of covering the positive and negative electrical terminals of the battery.

According to another embodiment, the safety member is of a single piece and includes at least two recesses allowing simultaneous access to an electrical connector either to the first connection position of the positive electrical terminal and the second connection position of the negative electrical terminal or to the second connection position of the positive electrical terminal and the first connection position of the negative electrical terminal. Also proposed is a battery comprising a positive electrical terminal and a negative electrical terminal, each being adapted to be connected to an electrical connector, the battery being adapted so that an electrical connector can be connected to each of the positive and negative electrical terminals at a first or a second connection position, the battery also comprising a safety device as proposed above.

Also proposed is a set of batteries as proposed above interconnected to form a series circuit, wherein the batteries are interconnected only by a single electrical connector, the connection positions of the electrical terminals not connected being obstructed by a safety member.

Also proposed is a method for making a set of batteries safe as proposed above, comprising the steps of determining the connection positions at the negative and positive terminals, the connection whereof to an electrical connector is to be prevented from among the first and second connection positions of the negative and positive electrical terminals of a battery, and positioning the safety member in the first or the second safety position depending on the determined connection positions.

BRIEF DESCRIPTION OF THE DRAWINGS

Other features and advantages of the invention will appear upon reading the description that follows of several embodiments of the invention, given by way of examples and with reference to the appended drawing.

FIG. 2 shows a schematic of a face of the battery according to FIG. 1a.

FIGS. 5 and 6 show a perspective view of the front and the reverse of a connection wall of a battery comprising a safety device.

FIG. 7 shows a schematic of another embodiment of the safety device of FIGS. 5 and 6.

DETAILED DESCRIPTION OF THE INVENTION

Figure 1A:
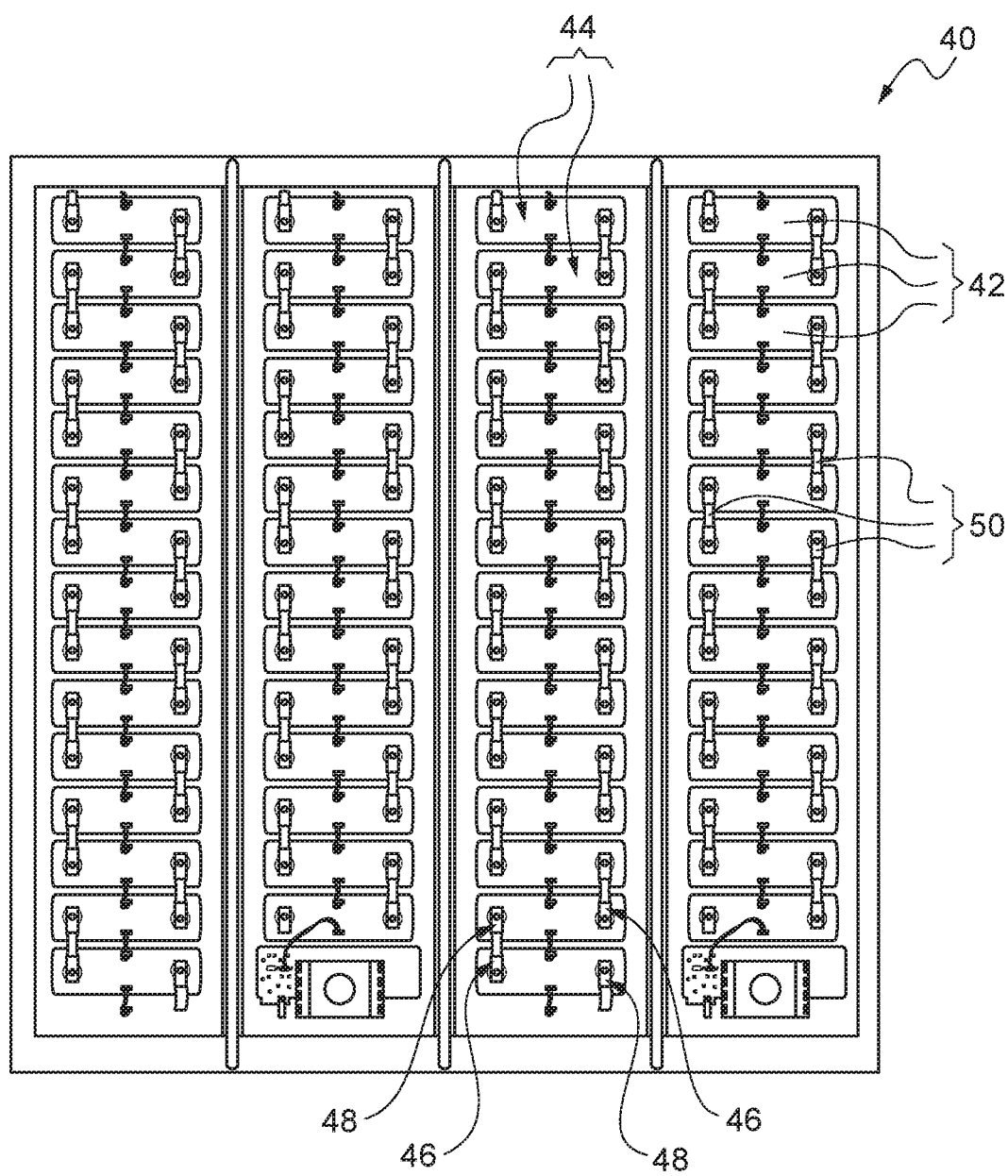
FIG. 1a shows a front view of a battery bay interconnected by means of electrical connectors.
Figure 1B:
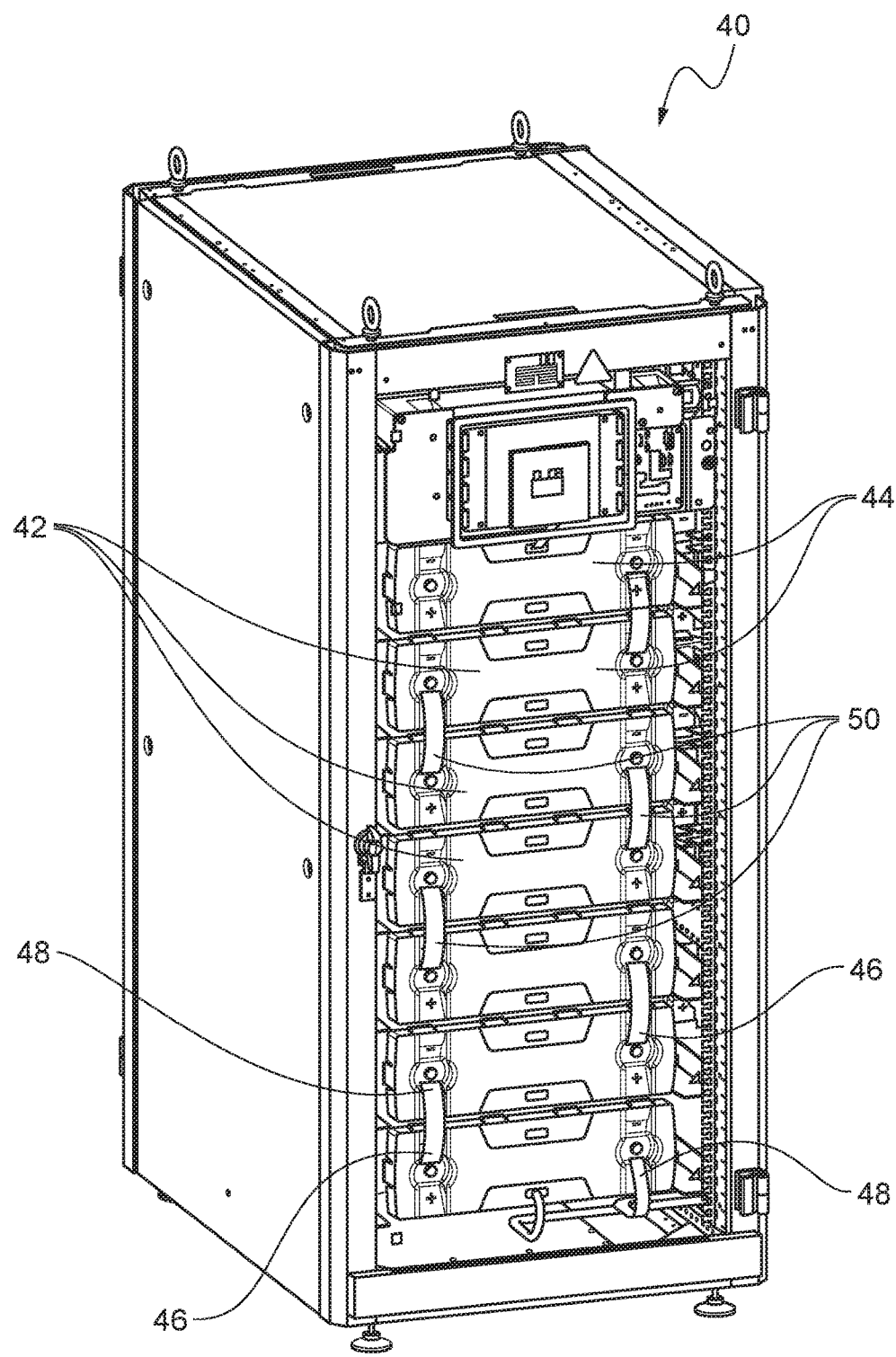
FIG. 1b shows a perspective view of a battery bay.
Figure 2:
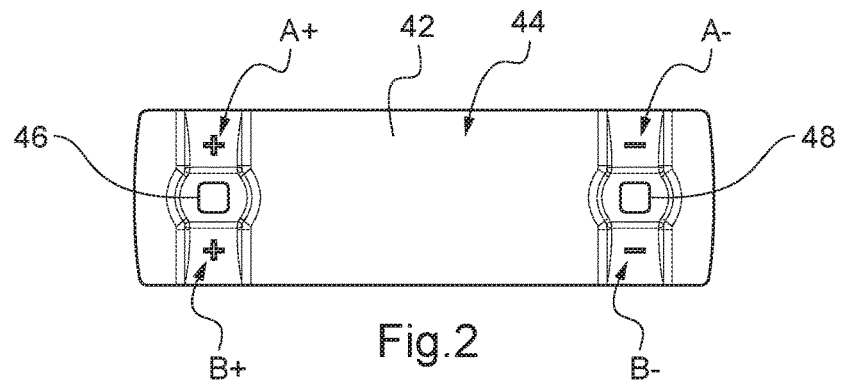
Figure 3:
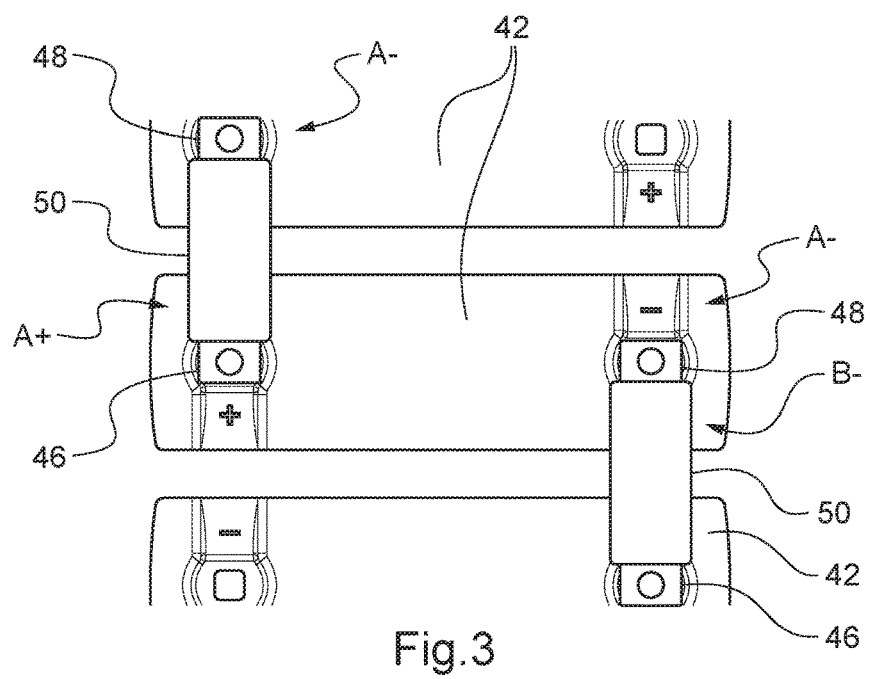
FIGS. 3 and 4 show a schematic of several batteries of the bay according to FIG. 1a, interconnected in an operating position and a position of failure of these batteries, respectively.
Figure 4:
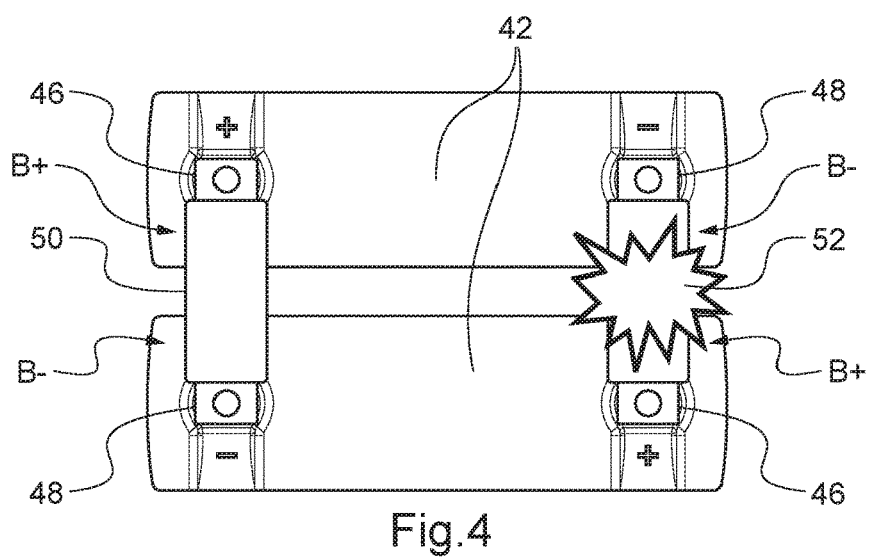

With reference to FIG. 5, a battery 12 is proposed intended to be used in a bay 40 shown in FIG. 1a, as a replacement for batteries 42. Moreover, the battery 12 is intended to be connected according to the connection assembly shown in FIG. 3, as a replacement for batteries 42.

The battery 12 comprises, at a connection wall 15, a positive electrical terminal 14 and a negative electrical terminal 16. Each of the positive 14 and negative 16 electrical terminals is adapted to be connected to an electrical connector 18 to connect the battery 12 to an electrical circuit or to another battery 12 comprised within the same electrical circuit.

To facilitate access to the positive 14 and negative 16 electrical terminals, the battery 12 is adapted so that the electrical connector 18 can be connected to each of the positive 14 and negative 16 electrical terminals using two connection positions. When the battery 12 is intended to be used in a bay 40 as shown in FIG. 1a, these two connection positions correspond to the position of an electrical connector 18 connecting the battery 12 to another battery 12 positioned above the battery 12.

Moreover, the battery 12 is made symmetrically with respect to an axis of symmetry I along which the connection wall 15 extends to allow reversible use of the battery 12, for example in a bay 40 as shown in FIG. 1a. What is meant by reversible is the fact of being able to use the battery 12 either in one position where a lower wall 17 of the battery 12 is substantially oriented toward the bottom of the bay 40, or in a position where the lower wall 17 is substantially oriented toward the top of the bay 40. In other words, when the connection wall 15 of the battery 12 is observed, the battery 12 can be used so that the positive electrical terminal 14 is positioned to the left of the battery 12, the negative electrical terminal 16 being therefore positioned to the right of the battery 12, or conversely, be used so that the positive electrical terminal 14 is positioned to the right of the battery 12, the negative electrical terminal 16 being positioned to the left of the battery 12. The reversibility of the battery 12 makes it possible, particularly in a bay 40, to position the batteries 12 head-to-tail, meaning that the positive electrical terminal 14 of a first battery 12 is positioned in the same vertical alignment as a negative electrical terminal 16 of a second battery 12 positioned above or below the first battery 12.

In addition, a safety device 19 is installed at the connection wall 15 of the battery 12. The safety device 19 comprises a safety member 20 intended to be selectively positioned either in a first safety position or in a second safety position.

The first safety position corresponds to a position wherein the safety member 20 prevents the connection of an electrical connector 18 in the second connection position B+ of the positive electrical terminal 14 and in the first connection position A− of the negative electrical terminal 16. In other words, when the safety member 20 is positioned in the first safety position, only the first connection position A+ of the positive electrical terminal 14 and the second connection position B− of the negative electrical terminal 16 are accessible to an electrical connector 18.

The second safety position corresponds to a position wherein the safety member 20 prevents the connection of an electrical connector 18 in the first connection position A+ of the positive electrical terminal 14 and in the second connection position B− of the negative electrical terminal 16. In other words, when the safety member 20 is positioned in the second safety position, only the second connection position B+ of the positive electrical terminal 14 and the first connection position A− of the negative electrical terminal 16 are accessible to an electrical connector 18.

The safety device 19 makes it possible to limit access to the positive 14 and negative 16 electrical terminals so that only the desired connection positions are accessible. This is particularly advantageous when the battery 12 is used in a bay 40 according to FIG. 1a wherein a plurality of batteries 12, each comprising a safety device 19, are installed one above the other and interconnected in series in the same electrical circuit. In such a bay 40, the safety devices 19 of the batteries 12 make it possible to avoid any mistake by an operator charged with interconnecting the batteries 12 by means of electrical connectors, given that access to connection positions which could cause a short-circuit is obstructed.

To allow the safety member 20 to be positioned in the first or second safety position, the safety member 20 comprises a first 22 and a second 24 arms extending between the positive 14 and negative 16 electrical terminals and being movable in translation, along a direction of translation extending substantially along the axis of symmetry I, between the positive 14 and negative 16 electrical terminals. In particular, each of the first 22 and second 24 arms includes a pair of end portions 23 adapted to prevent respectively the connection of an electrical connector 18 either to one of the first connection positions A+ and A− or to one of the second connection positions B+ and B− of the positive 14 and negative 16 electrical terminals. In other words, the first arm 22 is adapted to be translated in the direction of translation so that one of the pair of end portions 23 of the first arm 22 is positioned either at the positive electrical terminal 14 or at the negative electrical terminal 16. In a similar manner, the second arm 24 is adapted to be translated in the direction of translation so that one of the pair of end portions 23 of the second arm 24 is positioned either at the positive electrical terminal 14 or at the negative electrical terminal 16.

Moreover, the safety member 20 is configured so that when one of the first 22 and second 24 arms translates in one direction, the other arm translates in the opposite direction. Thus, the safety member 20 can only be positioned in the first or the second safety positions.

To allow simultaneous and opposite translation of the first 22 and second 24 arms, the safety member 20 also comprises a connection arm 26 integral with each of the first 22 and second 24 arms. The connection arm 26 is movable in rotation about an axis of rotation extending transversely to the direction of translation. To accomplish the connection between the connection arm 26 and the first 22 and second 24 arms, a pin (not visible) is formed on each of the first 22 and second 24 arms to cooperate with an opening formed at each end of the connecting arm 26. To facilitate the simultaneous translation of the first 22 and second 24 arms, the opening formed at each end of the connection arm 26 is an oblong hole extending in a direction passing through the axis of rotation of the connection arm 26.

Moreover, to selectively position the safety member 20 in the first or the second safety position, the safety member 20 includes an actuating element 25 of the connection arm 26 so that the rotation of the actuating element 25 drives the rotation of the connection arm 26. To make it possible for it to be actuated, the actuating element 25 is accessible at the opposite side of the connection wall 15 on the side where the connection arm 26 is positioned. The actuating element 25 is a pin integral or in one piece with the connection arm 26 extending along and at the axis of rotation of the connection arm 26. Alternatively to an extension of the axis of rotation of the connection arm 26, the actuating element 25 can be eccentric with respect to the axis of rotation of the connection arm 26 and be accessible through a circular opening formed in the connection wall 15 and extending around the axis of rotation of the connection arm 26.

Alternatively to the embodiment of the safety member 20 shown in FIGS. 5 and 6, the safety member 20 can be formed as shown in FIG. 7.

Referring to FIG. 7, the safety member 20 includes a first 28 and a second 30 gear wheels positioned respectively at the positive 14 and negative 16 electrical terminals. In particular, each of the first 28 and second 30 gear wheels is positioned around one of the positive 14 and negative 16 electrical terminals.

The first gear wheel 28 is adapted to prevent the connection of an electrical connector 18 in one of the first A+ and second B+ connection positions of the positive electrical terminal 14 and simultaneously allow access to the other of the first A+ and second B+ connection positions.

Similarly to the first gear wheel 28, the second gear wheel 30 is adapted to prevent the connection of an electrical connector 18 in one of the first A− and second B− connection positions of the negative electrical terminal 16 and to simultaneously allow access to the other of the first A− and second B− connection positions.

To make it possible to prevent access by an electrical connector 18 to one or the other of the first A+ and A− or second B+ and B− connection positions, the first 28 and the second 30 gear wheels each include a blocking portion 33 capable of preventing access by an electrical connector 18 to one of the first A+ and A− or to one of the second B+ and B− connection positions of the positive 14 and negative 16 electrical terminals.

To allow access by an electrical connector 18 to the desired connection positions, a recess 32 is formed in each of the first 28 and second 30 gear wheels to allow access by an electrical connector 18 to that of the first A+ and A− or to that of the second B+ and B− connection positions to which access is not obstructed. In particular, the recess 32 is formed opposite to the blocking portion 33 with respect to the corresponding gear wheel so that a rotation by an angle of 180° of one of the first 28 and second 30 gear wheels makes it possible to pass from a position where the first corresponding connection position A+ or A− is accessible to a position where the second corresponding connection position B+ or B− is accessible.

Moreover, the first 28 and second 30 gear wheels are assembled in opposite directions to allow the safety member 20 to be positioned in the first or second safety position. In other words, when the recess 32 of the first gear wheel 28 allows access to the first connection position A+ of the positive electrical terminal 14, the recess 32 of the second gear wheel 30 allows access to the second connection position B− of the negative electrical terminal 16. Similarly, when the recess 32 of the first gear wheel 28 allows access to the second connection position B+ of the positive electrical terminal 14, the recess 32 of the second gear wheel 30 allows access to the first connection position A− of the negative electrical terminal 16.

To simultaneously move the first 28 and second 30 gear wheels, the safety member 20 also comprises a toothed connection wheel 34 capable of cooperating by meshing with each of the first 28 and second 30 gear wheels so that rotation in a certain direction of rotation of one of the first 28 and second 30 gear wheels causes a rotation in the opposite direction of the other gear wheel.

Moreover, a method is also proposed for making safe a set of batteries 12 installed in a bay 40 according to FIG. 1a. The method for making them safe comprises a step consisting of determining the connection position to the negative 16 and positive 14 electrical terminal, the connection whereof to an electrical connector 18 is to be prevented, from among the first A+ and A− and second B+ and B− connection positions to the negative 16 and positive 14 electrical terminals of a battery 12. The method also includes a step consisting of positioning the safety member 20 in the first or the second safety position depending on the determined connection positions A+, A−, B+ and/or B−.

According to another embodiment, the safety member 20 comprises a single part, that is formed in one piece, connecting the set of first A+ and A− and second B+ and B− access positions to the positive 14 and negative 16 electrical terminals. To allow the safety member 20 to be positioned in the first or the second safety position, at least two recesses are formed in the safety member to allow simultaneous access for an electrical connector 50 either to the first connection position A+ of the positive electrical terminal 14 and the second connection position B− of the negative electrical terminal 16 or to the second connection position B+ of the positive electrical terminal 14 and the first connection position A− of the negative electrical terminal 16. According to one variant, the safety member 20 can be flexible and formed from a ribbon connecting the first A+ and A− and second B+ and B− connection positions of the positive 14 and negative 16 electrical terminals.

Of course, the present invention is not limited to the examples and to the embodiment described and shown, but rather it is subject to numerous variants accessible to the person skilled in the art.

Alternatively, the safety device 19 can be used on a battery 12 having positive 14 and negative 16 electrical terminals arranged on different walls of the battery 12 or on the same wall of the battery 12 but on a wall different from the wall positioned on a face of a bay 40 according to FIG. 1a. In addition, the safety device 19 can be used on a battery 12 wherein the connection positions to the positive 14 and negative 16 electrical terminals are oriented in a different direction than the direction extending from top to bottom as shown in FIG. 1a, wherein the electrical terminals of the batteries 12 are aligned from top to bottom.

Moreover, the connection arm 26 of one embodiment of the safety member 20 can be replaced by any other element allowing the first 22 and the second 24 arm to be moved simultaneously in opposite directions, such as for example a gear wheel meshing with a rectilinear toothed portion formed on each arm to create a dual rack system. Similarly, the gear wheel 34 of one embodiment of the safety member 20 can be replaced by any element making it possible to move simultaneously in rotation in opposite directions the first 28 and second 30 gear wheels, such as for example a rod and crank assembly integral with each of the first 28 and second 30 gear wheels, pivots, cams, rockers or a flexible blade.

Moreover, the safety device 19 can be used in a battery including more than two electrical terminals, four electrical terminals for example.

The invention claimed is:

1. A safety device for a battery comprising a positive electrical terminal and a negative electrical terminal, each being adapted to be connected to an electrical connector, the battery and the electrical connector being configured so that the electrical connector can be connected to each of the positive and negative electrical terminals at first and second alternate connection positions, the safety device comprising a safety member adapted to be selectively positioned in:
  a first safety position wherein the safety member prevents the connection of an electrical connector in the second connection position of the positive electrical terminal and in the first connection position of the negative electrical terminal; or
  a second safety position wherein the safety member prevents the connection of an electrical connector in the first connection position of the positive electrical terminal and in the second connection position of the negative electrical terminal.

2. The safety device according to claim 1, wherein the safety member is adapted to be moved in translation to be positioned in the first or the second safety position.

3. The safety device according to claim 2, wherein the safety member comprises:
  a first arm movable between the positive and negative electrical terminals adapted to prevent the connection of an electrical connector in:
    the first connection position of the positive electrical terminal and to simultaneously allow access to the first connection position of the negative electrical terminal; or
    the first connection position of the negative terminal and to simultaneously allow access to the first connection position of the positive electrical terminal; and
  a second arm movable between the positive and negative electrical terminals adapted to prevent the connection of an electrical connector in:
    the second connection position of the positive electrical terminal and to simultaneously allow access to the second connection position of the negative electrical terminal; or
    the second connection position of the negative electrical terminal and to simultaneously allow access to the second connection position of the positive electrical terminal.

4. The safety device according to claim 3, wherein the safety member also comprises a connection arm integral with each of the first and second arms so that when one of the first and second arms translates in one direction, the other translates in the opposite direction.

5. The safety device according to claim 2, wherein the safety member is of a single piece and includes at least two recesses allowing simultaneous access to an electrical connector:
  either to the first connection position of the positive electrical terminal and the second connection position of the negative electrical terminal;
  or to the second connection position of the positive electrical terminal and the first connection position of the negative electrical terminal.

6. The safety device according to claim 1, which is adapted to be integrated into a connection wall of a battery capable of covering the positive and negative electrical terminals of the battery.

7. The safety device according to claim 1, wherein the safety member is adapted to be moved in rotation to be positioned in the first or the second safety position.

8. The safety device according to claim 7, wherein the safety member comprises:
  a first element movable between the first and second connection positions of the positive electrical terminal adapted to prevent the connection of an electrical connector in:
    the first connection position of the positive electrical terminal and to simultaneously allow access to the second connection position of the positive electrical terminal; or
    the second connection position of the positive electrical terminal and to simultaneously allow access to the first connection position of the positive electrical terminal; and
  a second element movable between the first and second connection positions of the negative electrical terminal adapted to prevent the connection of an electrical connector in:
    the first connection position of the negative electrical terminal and to simultaneously allow access to the second connection position of the negative electrical terminal; or
    the second connection position of the negative electrical terminal and to simultaneously allow access to the first connection position of the negative electrical terminal.

9. The safety device according to claim 8, wherein the first and second movable elements are formed by a gear wheel movable about its axis, including a recess adapted to be positioned at one of the first and second connection positions to allow access to an electrical connector.

10. The safety device according to claim 9, wherein the safety member also comprises a connection element between the first and second movable elements, the connection element being formed by a gear wheel movable about its axis, adapted to cooperate by meshing with the first and second movable elements so that a rotation in one direction of rotation of one of the first and second movable elements causes a rotation of the other movable element in the opposite direction.

11. A battery comprising a positive electrical terminal and a negative electrical terminal, each being adapted to be connected to an electrical connector, the battery and the electrical connector being configured so that the electrical connector can be connected to each of the positive and negative electrical terminals in first and second alternate connection positions, the battery also comprising a safety device including a safety member adapted to be selectively positioned in:
- a first safety position wherein the safety member prevents the connection of an electrical connector in the second connection position of the positive electrical terminal and in the first connection position of the negative electrical terminal; or
- a second safety position wherein the safety member prevents the connection of an electrical connector in the first connection position of the positive electrical terminal and in the second connection position of the negative electrical terminal.

12. A set of batteries interconnected to form a series circuit, each battery comprising a positive electrical terminal and a negative electrical terminal, each being adapted to be connected to an electrical connector, said each battery and the electrical connector being configured so that the electrical connector can be connected to each of the positive and negative electrical terminals in first and second alternate connection positions, the said each battery also comprising a safety device including a safety member adapted to be selectively positioned in:
- a first safety position wherein the safety member prevents the connection of an electrical connector in the second connection position of the positive electrical terminal and in the first connection position of the negative electrical terminal; or
- a second safety position wherein the safety member prevents the connection of an electrical connector in the first connection position of the positive electrical terminal and in the second connection position of the negative electrical terminal, wherein the batteries are interconnected only by a single electrical connector, the first and second connection positions of the positive and negative electrical terminals not connected being obstructed by a safety member.

13. A method for making a set of batteries interconnected to form a series circuit safe, each battery comprising a positive electrical terminal and a negative electrical terminal, each being adapted to be connected to an electrical connector, said each battery and the electrical connector being configured so that the electrical connector can be connected to each of the positive and negative electrical terminals in first and second alternate connection positions, said each battery also comprising a safety device including a safety member adapted to be selectively positioned in:
- a first safety position wherein the safety member prevents the connection of an electrical connector in the second connection position of the positive electrical terminal and in the first connection position of the negative electrical terminal; or
- a second safety position wherein the safety member prevents the connection of an electrical connector in the first connection position of the positive electrical terminal and in the second connection position of the negative electrical terminal, wherein the batteries are interconnected only by a single electrical connector, the first and second connection positions of the positive and negative electrical terminals not connected being obstructed by a safety member, the method for making the set of batteries safe comprising the steps of:
- determining the first and second connection positions to the negative and positive terminals, the connection whereof to an electrical connector is to be prevented from among the first and second connection positions of the negative and positive electrical terminals of a battery;
- positioning the safety member in the first or the second safety position depending on the first and second determined connection positions.

\* \* \* \* \*